(12) United States Patent
Bhatti (10) Patent No.: US 7,672,289 B2
(45) Date of Patent: Mar. 2, 2010

(54) METHOD FOR DEFINING, ALLOCATING AND ASSIGNING ADDRESSES IN AD HOC WIRELESS NETWORKS

(75) Inventor: Ghulam Bhatti, Plainville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 773 days.

(21) Appl. No.: 11/484,103

(22) Filed: Jul. 11, 2006

(65) Prior Publication Data

US 2007/0060143 A1    Mar. 15, 2007

Related U.S. Application Data

(63) Continuation-in-part of application No. 11/261,890, filed on Oct. 28, 2005, which is a continuation-in-part of application No. 11/199,625, filed on Aug. 9, 2005.

(51) Int. Cl.
*H04J 3/24* (2006.01)
(52) U.S. Cl. ............... 370/349; 370/389; 370/392; 370/393; 370/471; 370/475; 370/254; 370/256; 370/338; 709/245; 711/200; 711/212
(58) Field of Classification Search ............ 370/254, 370/256, 338, 389, 392, 393, 471, 475; 711/200, 711/212; 709/245
See application file for complete search history.

(56) References Cited

U.S. PATENT DOCUMENTS

| 5,682,479 | A  | * | 10/1997 | Newhall et al. ............. 709/242 |
| 7,058,973 | B1 | * | 6/2006  | Sultan ......................... 726/12  |
| 2002/0012320 | A1 | * | 1/2002 | Ogier et al. ................. 370/252 |
| 2005/0013297 | A1 | * | 1/2005 | Eriksson ..................... 370/392 |
| 2006/0088015 | A1 | * | 4/2006 | Kakivaya et al. ............ 370/338 |

OTHER PUBLICATIONS

ZigBee Document 053474r06, Version 1.0; Dec. 14, 2004; p. 159-251.

* cited by examiner

*Primary Examiner*—Nick Corsaro
*Assistant Examiner*—Amanuel Lebassi
(74) *Attorney, Agent, or Firm*—Gene Vinokur; Dirk Brinkman (57) ABSTRACT

A method allocates and assigns addresses to nodes in an ad hoc wireless network. A set of potential addresses of nodes in an ad hoc wireless network are defined as having N fields, in which the number of bits in each field is one or more bits. A subset of the set addresses is allocated initially as addresses to be assigned to nodes joining the network, in which each address has N-K fields, where 0<K<N. The size of the subset of addresses is increased adaptively by increasing the number of fields in each address in the subset.

20 Claims, 12 Drawing Sheets

METHOD FOR DEFINING, ALLOCATING AND ASSIGNING ADDRESSES IN AD HOC WIRELESS NETWORKS

RELATED APPLICATIONS

This application is a Continuation-in-Part of U.S. patent application Ser. No. 11/261,890, entitled "Structured Addressing Method for Wireless Networks" and filed by Bhatti on Oct. 28, 2005, which is Continuation-in-Part of U.S. patent application Ser. No. 11/199,625, entitled "Structured Addressing Scheme for Wireless Networks," and filed by Bhatti et al. on Aug. 9, 2005.

FIELD OF THE INVENTION

This invention relates generally to wireless networks, and more particularly to defining, allocating and assigning adaptively addresses to nodes in an ad hoc wireless sensor networks (WSN).

BACKGROUND OF THE INVENTION

The latest advances in wireless networks have enabled applications such as home and industrial automation, environment monitoring and sensing, security and surveillance; human and goods tracking; and medical monitoring. Typically, such networks are ad hoc, and use very small sensor nodes with a relatively short communications range.

In such wireless network, nodes can only communicate with other nodes that are within transmission range. To communicate with distant nodes requires multi-hop transmissions. Each node has a unique address to facilitate communication among the nodes.

Address allocation and assignment in an ad hoc network is a problem due to the spontaneous nature of the network topology. Nodes can appear and disappear randomly. The geographical distribution of the nodes can be highly irregular. Furthermore, if the nodes are very small sensor nodes, storage, power, transmission range and processing throughput are all limited. This means that addressing schemes used in conventional networks, where the end nodes typically are personal computers, cannot be used.

Typically, the address is assigned to a node when the node 'joins' the network in an ad hoc manner. That is, when and where the node joins the network cannot be predicted. The address assignment method should be efficient in terms of storage, power, and processing throughput. The method should be a distributed to avoid bottlenecks and single point of failures. In addition, the distributed addressing method should ensure that no address conflicts occur, i.e., multiple nodes have the same network address, or provide a mechanism for detecting and resolving address conflicts.

The set of addresses is a precious resource in an ad hoc WSN. Therefore, addresses should not be wasted. The addressing method should be error resistant and flexible to adapt to various physical network topologies and geographical distributions of nodes. For example, a dense concentration of nodes in one part of the network should not cause local deficiencies of addresses, even though unused addresses are available in other parts of the network. The distributed addressing method should ideally enable a node to join the network with a high probability when at least one address is unused in the network. Because, the sensor nodes are very small and not perfectly reliable, sensors can be lost. Therefore, the distributed addressing method should be able to identify, reclaim, and reassign the address assigned to nodes that cease to function.

Some addressing schemes, such as the one used by the ZigBee Alliance, use a hierarchical tree of addresses, ZigBee Alliance, "ZigBee Standard Specification in 053474r06ZB_TSC-ZigBee-Specification-v1[1].0", December 2004. A ZigBee coordinator (ZC) node initially has control over all addresses.

Subsequently, a parent node, beginning with the ZC node, allocates a subset of its set of addresses to a child node when the child node joins network. In the ZigBee scheme, the number of child nodes for any parent node is fixed as a configuration parameter. Therefore, it is possible to systematically determine the subset of the total potential set of addresses that is allocated to a joining child node. That facilitates routing of frames without explicit route discovery via broadcast frames.

However, the static structure of the formats of the ZigBee addresses can waste addresses, or even deny some parent nodes from assigning addresses to potential child nodes. In addition, there is a restriction on the maximum number of levels that the addressing tree can have in the network. Furthermore, a failure of a single node can make nodes with addresses lower in the tree inaccessible. This is a serious problem when the failed node is near the root of the tree.

Another addressing scheme uses a distributed dynamic address assignment protocol, S. Nesargi and R. Prakash, "MANETconf: Configuration of Hosts in a Mobile Ad Hoc Network," Proceedings of IEEE Infocom, June 2002. That protocol uses a mutual exclusion process, G. Ricart and A. K. Agrawala, "An optimal algorithm for mutual exclusion in computer networks," Comm. ACM, 24(1), pp. 9-17, 1981. A joining node selects a neighboring node as an initiator node. The initiator node selects an address and broadcasts a frame to notify all other nodes in the network of the selected address. Then, the initiator node waits for responses from the other nodes in the network. If the responses from all of the nodes are positive, meaning no other node is using the selected address, then the initiator node assigns this address to the joining node. Otherwise, the initiator node selects another address.

However, there are several problems with that protocol. All nodes must maintain information about the allocated addresses. This requires memory, which is a limited resource in small sensor nodes. In addition, the broadcast frames and other management frames consume network resources such as bandwidth and power. Moreover, the initiator node can select any address. Therefore, the address assignment does not necessarily follow a regular or systematic pattern. This makes route discovery a problem. Obviously, that addressing scheme is infeasible for ad hoc wireless networks where there can be thousands of sensor nodes.

Another addressing scheme uses a binary partitioning process, M. Mohsin and R. Prakash, "IP Address Assignment in a Mobile Ad Hoc Network," IEEE Military Communications Conference (MILCOM 2002), volume 2, pp. 856-861, October 2002. Each node maintains a block of available addresses. When a node wants to join the network, the joining node requests an address from a neighboring configuring node. The configuring node partitions the block into two halves, and retains one half of the block, and allocates the other half to the requesting node. Every node maintains an address table to record the blocks of addresses. Each node also broadcasts periodically its block of addresses to enable other nodes to update their address tables. Addresses can also be 'borrowed' from other nodes. That scheme also leads to an address assignment that does not follow a regular or systematic pattern. Due to the storage and transmission costs, that addressing scheme is also not suitable for ad hoc wireless sensor networks.

Another scheme performs duplicate address detection, C. E. Perkins, J. T. Malinen, R. Wakikawa, E. M. Belding-Royer, and Y. Sun, "IP Address Autoconfiguration for Ad Hoc Networks," IETF Internet Draft, draft-ietf-manet-autoconf-01.txt, November 2001. A joining node selects two random addresses, each from a different group of available addresses. One address is used as a temporary source address for a verification process. The other address is intended for final address assignment, pending the verification process. That scheme also requires a large number of broadcast frames, and addresses are generated randomly.

The parent application describes a set of addresses arranged in an N-dimensional hypercube, or generally a parallelepiped, such that each address in the set becomes an n-tuple value. As new nodes join the network, addresses along appropriate dimension can be assigned to these nodes. The assignment of the addresses to the nodes does not deal with address conflict detection and resolution.

The continuation-in-part application of the parent transforms the N-dimensional address set to a tree structure. That transformation enables the addresses to be assigned in a systematic way, such that no address conflicts take place. While that scheme ensures that no address collisions occur, other potentially problematic aspects of tree addressing remain unaddressed.

Specifically, a static tree structure does not adapt well to any geographic topology of the network, e.g., when the nodes the distribution of the nodes is irregular. As a result, a new node may not be able to join in one part of the network due to unavailability of free addresses even though plenty of unused addresses may be available in another remote part of the network. Moreover, that transformation is not efficient in terms of address utilization. More specifically, almost half of the addresses remain unassigned in that scheme, and are effectively discarded. The set of addresses, being a precious resource, should not be underutilized in such a manner.

It should be noted that in most of the above addressing schemes the format of the addresses is fixed. This makes it difficult to adapt the addresses to an ad hoc wireless network where the network topology is constantly changing as nodes join and leave the network.

SUMMARY OF THE INVENTION

The embodiments of the invention provide methods for defining, allocating and assigning addresses to nodes in a wireless network. The methods can be used for ad hoc networks, sensor networks, mesh networks, multi-hop networks, and other networks.

The method has a low overhead for memory and broadcast requirements. There are no restrictions on the maximum number of hops, or the number of parent-child node relationships. The method limits waste of addresses when the physical location of the nodes is not uniformly distributed.

In one embodiment, the method transforms the set of addresses from a parallelepiped structure to a tree structure. Initially, a subset of the total address set is reserved and subsequently allocated adaptively. As additional addresses are need, the subset of allocated addressees is increased gradually along one dimension at a time as the network grows.

The method begins with an N-K dimensional set of addresses, where $0<K<N$. For example, addresses are allocated along N-1 dimensions. If a node needs additional addresses, then the node can request an additional block of addresses, from a coordinator node of the network. That block is actually a block of unallocated address along the $N^{th}$ dimension.

In another embodiment, the method also begins with a potential N-dimensional set of addresses space. Initially, the size in each dimension is reduced to produce subsets of addresses. The subset of addresses is increased along a suitable dimension when a parent node needs additional addresses to allocate to child nodes.

For example, considering N=2, and there are 256 potential addresses along each dimension. In other words, each address has two fields, and each field is eight bits, i, M=8. Therefore, the potential set of addresses has 256×256=64 K addresses. It should be noted, that M can be different or the same for the different fields.

The initial definition can be predefined. That is, all nodes and potential nodes 'know' the default, initial format. Alternatively, the current format is provided to a node when the nod joins the network.

Initially, the network has only a block of 64 addresses along each dimension. In other words, the network begins with a block of addresses where each address has two, six bit fields. This reduced size block has a size of 64×64=4K addresses.

Subsequently, if a node needs additional addresses, the node can increase the number of bits for one of the fields. For example, if the size M of one particular field is increased by one bit, then the size of the subset along that dimension doubles to, e.g., 128 values, and the allocatable address space becomes 128×64=8K.

The node needs to inform all other nodes in the network about the new size of its address space. This can be done by broadcasting a single network wide frame. In this way, the addressing scheme becomes very robust and adaptive to the physical topology of network.

The addresses scheme guarantees that no address conflict takes place while nodes allocate address to their child nodes in a distributed fashion. It has minimal overhead because nodes do not need to obtain addresses from the coordinator node. In addition, conflict detection and resolution is not needed.

DETAILED DESCRIPTION OF THE PREFERRED EMBODIMENTS

Figure 1:
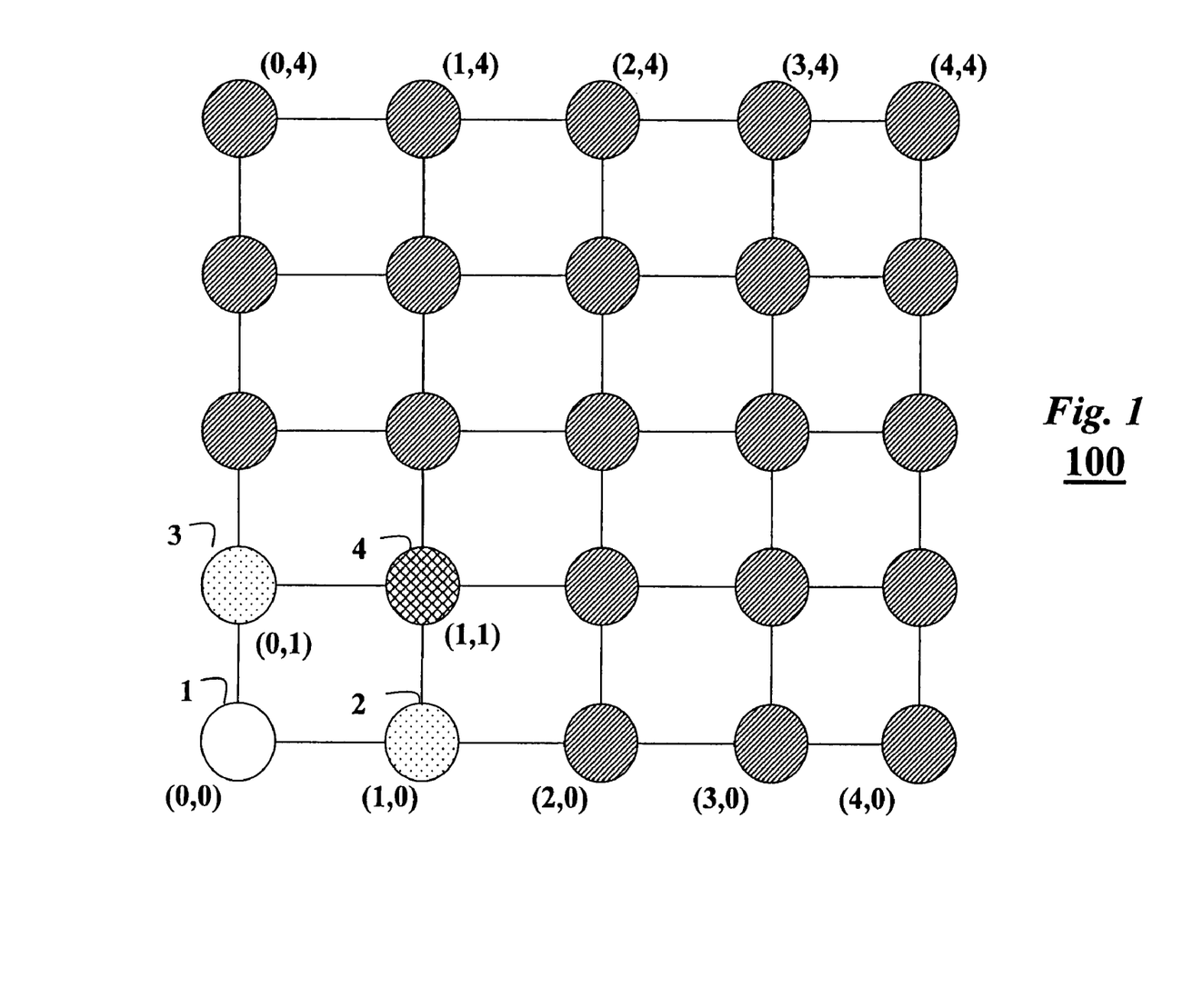
FIG. 1 is a grid of nodes and corresponding addresses in a Cartesian coordinate space according to an embodiment of the invention.

FIG. 1 shows an example N-dimensional grid 100 of nodes, where N is 2, in an ad hoc wireless sensor network according to an embodiment of our invention. Each intersection of the grid has coordinates, e.g., (0, 0), (0, 1), . . . (4, 4). The coordinates of the nodes or N-tuples are addresses of corresponding nodes. The coordinates have N fields that are equal to the dimensionality of the grid. For example, in two dimensions, each address has two fields.

A range of M values for a particular field is expressed by a number of bits that constitute the field. For example, if a full address is specified by 16 bits, then each field can be assigned eight bits for values in a range [0, 255]. Alternatively, the assignment is six and ten bits, i.e., here the value of M is different for the two particular fields. In other words, the grids can be an N dimensional hypercube, or generally a higher order parallelepiped. Additional dimensions can also be used.

A 'corner' node 1 can be a coordinator node with an address (0, 0). Stippled nodes 2-3 have assigned addresses. Cross-hatched node 4 is requesting an address. It should be noted that address allocation and assignment can start at any corner node.

If each field is allocated eight bits, then four possible corner addresses are (0x0, 0x0), (0x0, 0xFF), (0xFF, 0x0), and (0xFF, 0xFF). We have selected (0x0, 0x0) as the starting address as a matter of convenience.

An address is assigned to a child node joining the network by having the child node first transmit an address request frame. In a ZigBee network, this can be a 'beacon request' frame. All potential parent nodes within transmission range reply by sending a beacon frame to the requesting node. That frame contains an identification of the sender in addition to some extra information. The child node selects one of the replying nodes as the parent node. The selection can consider the compactness of the address space or the signal strength of the responding node.

The selected parent node then assigns an address to the child node as follows. The value of one field of the child node address is made one larger than the corresponding field of the parent node. For example, if the address of the parent node $N_1$ is (0, 0), then the address of the joining child node $N_2$ can be (0x1, 0x0) or (0x0, 0x1).

Other nodes that can possibly assign the same address subsequently are notified of the address assignment. For example, in FIG. 1, both nodes 2 and 3 can assign the same address to node 4. If node 2 assigns first, then node 3 is informed by node 2 that the address (1, 1) has been assigned to node 4. However, rules can be used to specify which address a node can assign. This removes the need of informing other nodes after an address assignment.

In one embodiment of the invention, the allocation and assignment order can be according to a predetermined indexing scheme of the fields. For example, the first field is incremented before the second field, and so forth. Thus, the ordering can cause the addresses to be distributed uniformly.

Figure 2:
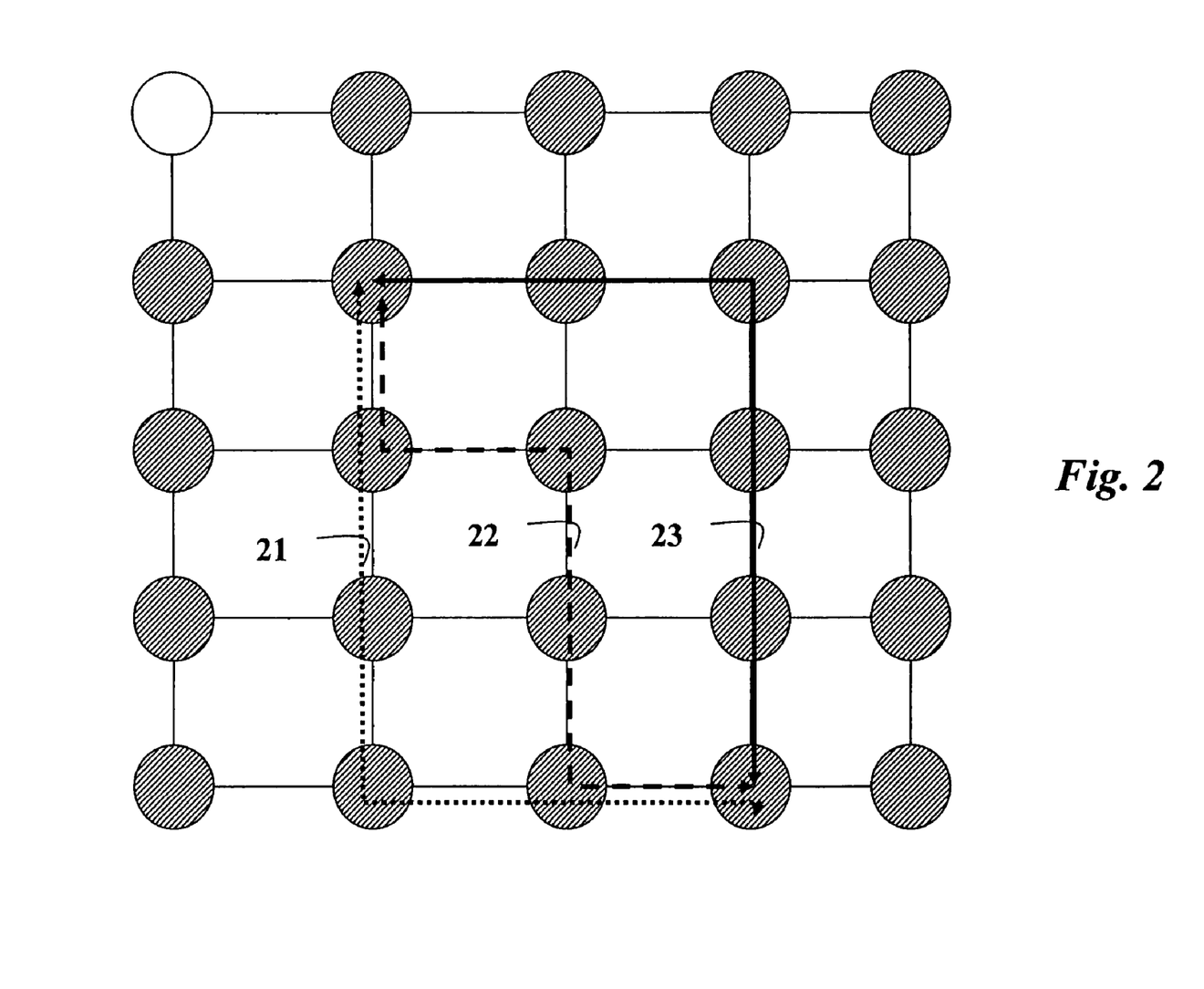
FIG. 2 is grid showing multiple routes according to an embodiment of the invention.

It should be noted, that the selected addressing order also implies possible routing between any two nodes. In addition, unlike the tree-structured routing of ZigBee, which only has one path to a particular node, our addressing scheme allows multiple paths 21-23, as shown in FIG. 2. Thus, the network, as a whole, is not affected by a failure of a single node. In fact, the network can continue to function even with multiple failed nodes, particularly if the number of dimensions of the grid is relatively high.

Address Conflicts

Address conflicts can be avoided as described above. When an address is assigned to a joining child node by the parent node, other nodes that can possibly assign the same address subsequently are notified of the address assignment. However, the need to notify other nodes causes overhead in the system.

In one embodiment, addresses are assigned to child nodes according to a selected field of the coordinates associated with a predetermined value. A parent node can assign an address to a child node, such that one field of the child node address is incremented by one.

Figure 3:
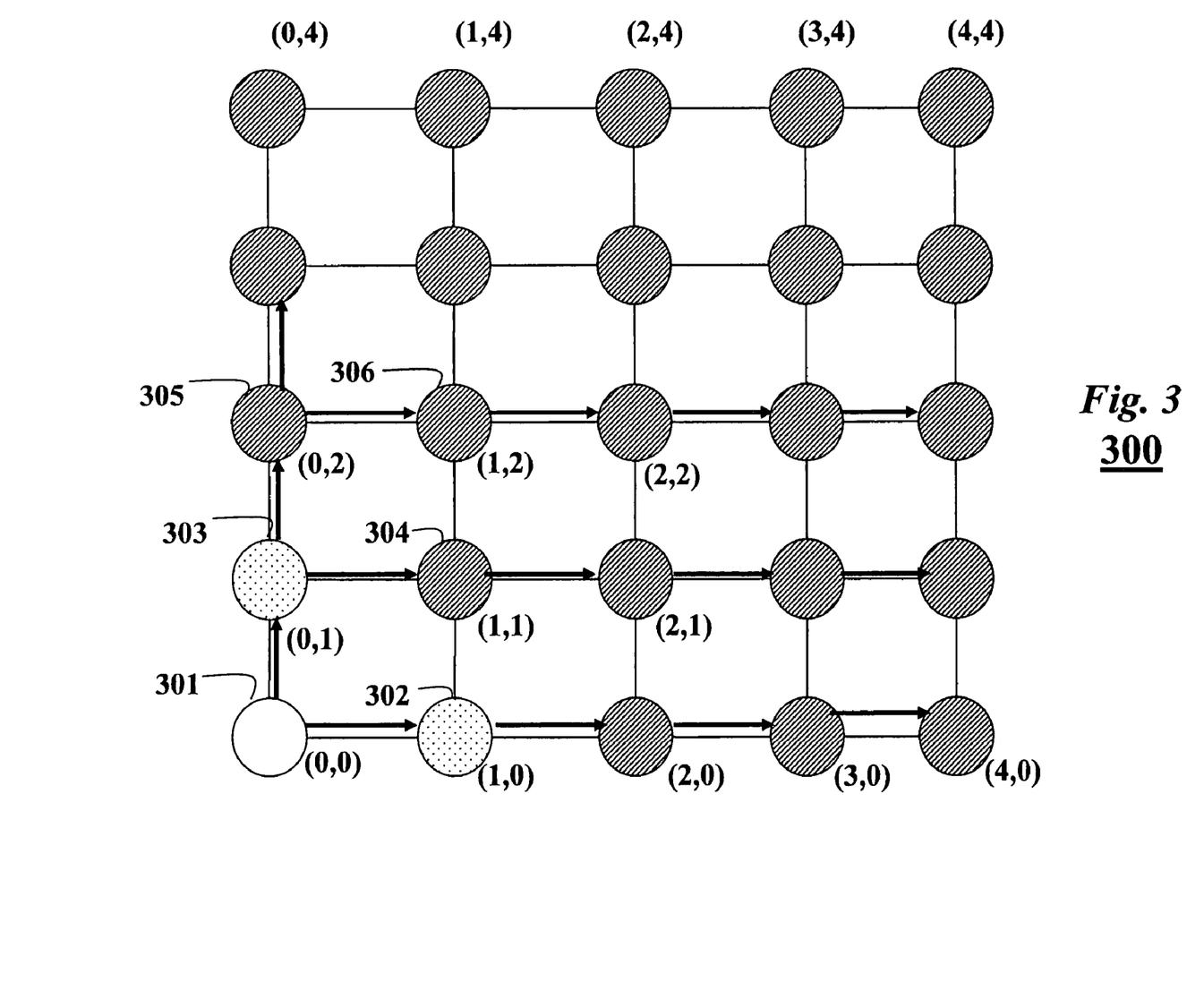
FIG. 3 is a grid of nodes and corresponding addresses in a Cartesian coordinate space according to an embodiment of the invention.

FIG. 3 shows N-dimensional grid 300 of nodes, where N is 2, in a wireless network according to an embodiment of our invention. It should be understood that the invention is not limited to two dimensions. Here, the first field is the selected field and the predetermined value is zero (0). Therefore, coordinator node 301 at [0, 0], acting as a parent node, can assign [1, 0] 302 or [0, 1] 303 as a child node address, because the selected field of the coordinator node, i.e., the first field, has the predetermined value (0). The same is true for a parent node at address [0, 1] 303. Since the selected field has the predetermined value, the parent node at [0, 1] can assign to [1, 1] 304, or [0,2] 305, or [0, 0], 301, if [0, 0] is available, i.e., if the coordinator node has different coordinates and [0, 0] is an unallocated address.

On the other hand, a parent node at [1,0] 302, or [1, 1] 304, or [1,2] 306, can only assign an address to a child node such that the selected field of the child node address is modified, by one, from the selected field of the parent node. Therefore, a parent node at [1, 0] 302, can only assign an address that modifies the selected field, i.e., the first field, by one, which would be [2, 0] or [0, 0], if available.

It should be noted that this addressing method can be represented as a tree, as described further below.

Figure 4:
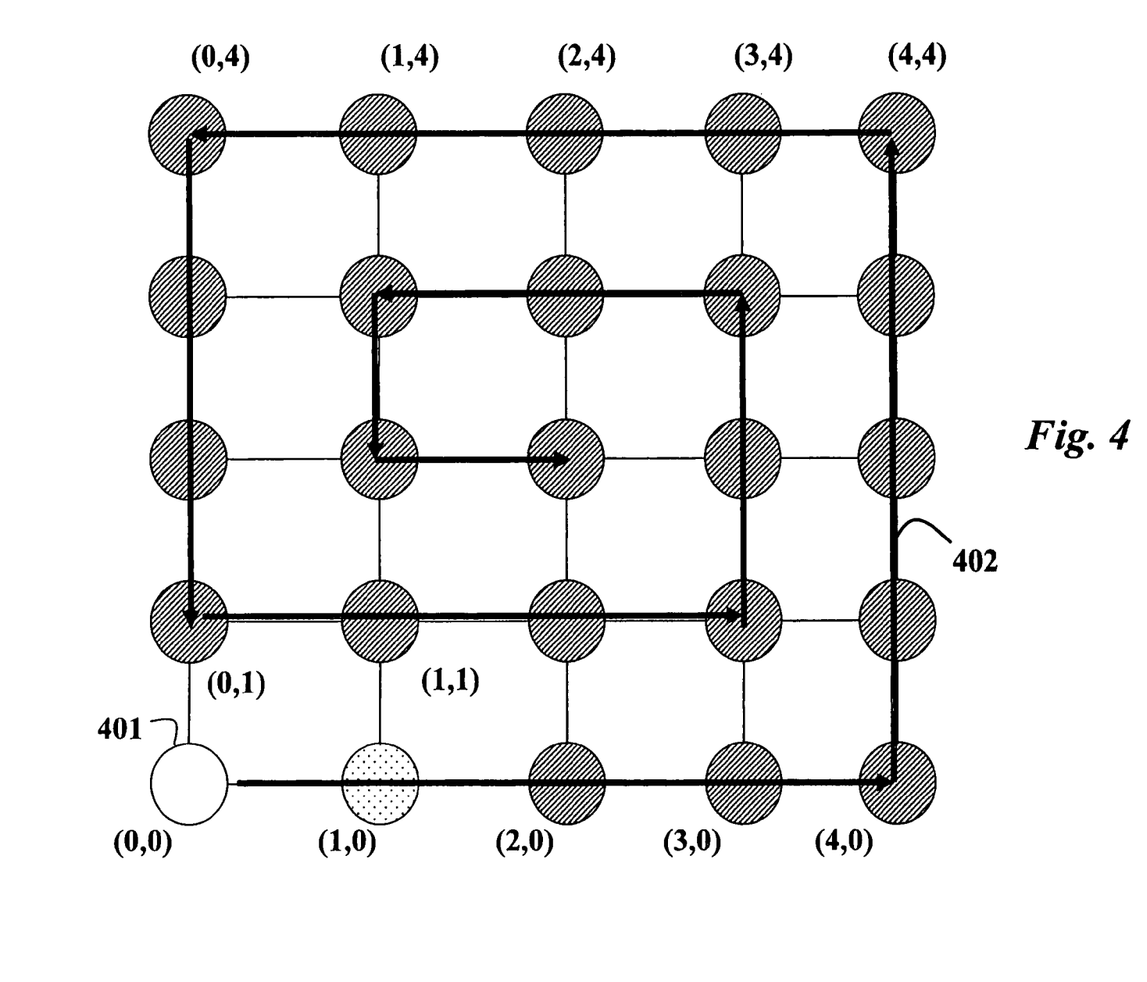
FIG. 4 is a grid of nodes and a corresponding sequence of addresses in a Cartesian coordinate space according to another embodiment of the invention.

It is possible to define many different addressing schemes by including additional conditions on the embodiment described above. For example, a set of fields can be selected and associated with a single predetermined value, or each select field of the set can be associated with a different predetermined value. In short, a set of selected fields can be associated with a set of predetermined values, where either or both sets can be one. For example, as shown in FIG. 4, it is possible to use the method for assigning addresses according to the invention using sets of fields and predetermined values to assign addresses beginning at a coordinator node 401 in a spiral pattern 402, without address clashes or a need to notify other nodes of address assignments.

One problem with the above addressing schemes is that the format of the addresses is fixed, i.e., both N and M are static. This makes it difficult to adapt the addresses to a highly dynamic ad hoc network.

Adaptive Address Definition, Allocation and Assignment

Figure 5:
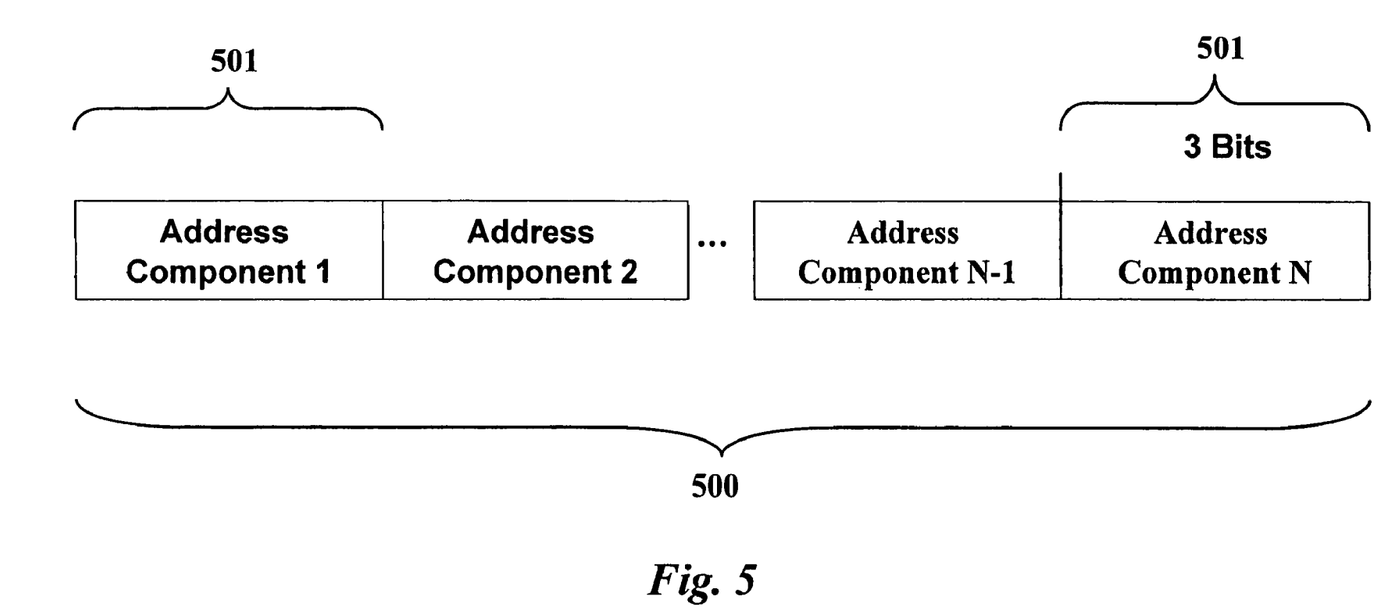
FIG. 5 is a block diagram of a format of N-dimensional address defined according to an embodiment of the invention.

FIG. 5 shows an example format of an N-dimensional address 500 defined according to an embodiment of the invention. The N fields 501 are address components of a potential N-dimensional address space. Each field can include M bits, where M is different for different fields. The fields are arranged in a right-to-left order, with a highest dimension in the right most field, and a lowest dimension on the left most field.

Figure 6:
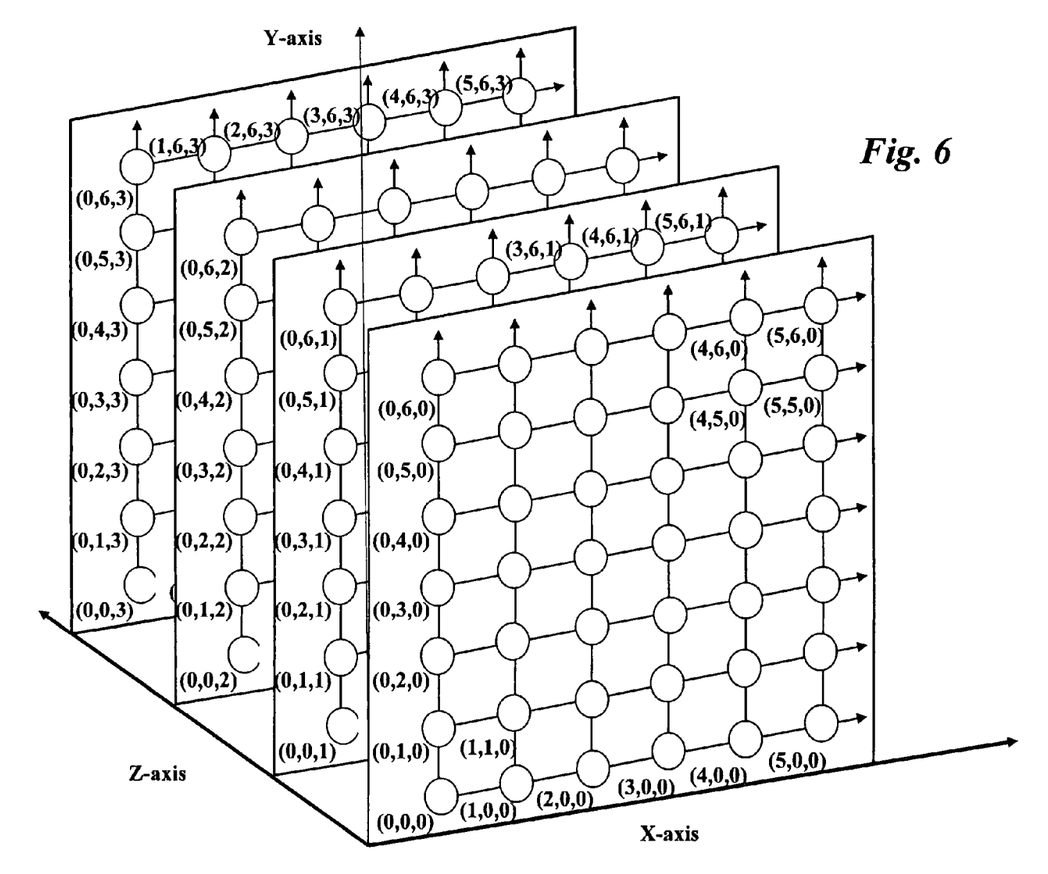
FIG. 6 is an N-dimensional parallelepiped of addresses according to an embodiment of the invention.

FIG. 6 shows how all potentially available addresses in this defined format can be arranged as an N-dimensional parallelepiped, as described above. There can be several ways of systematically allocating and assigning addresses using this structured address space.

Figure 7:
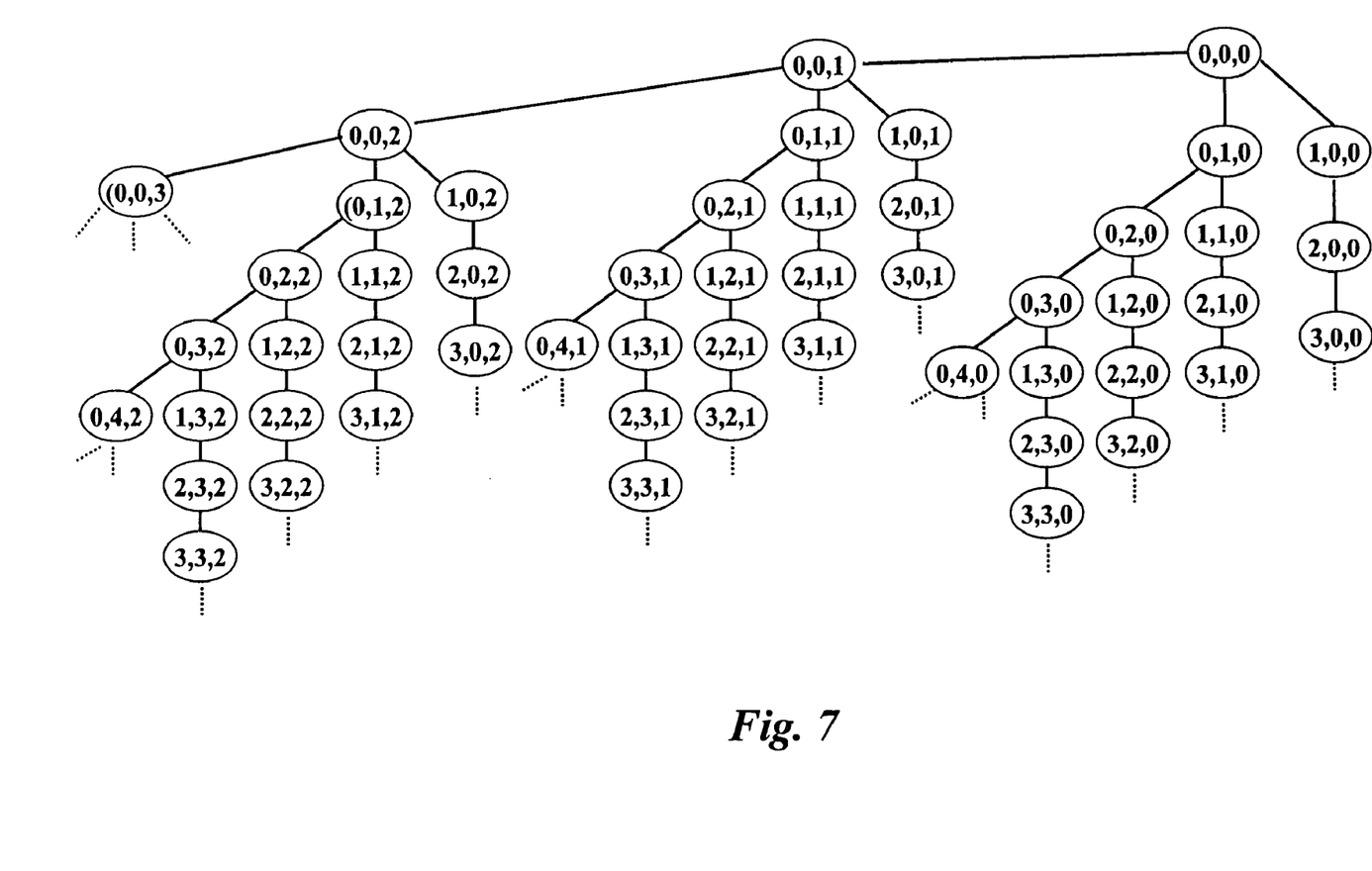
FIGS. 7 and 8 are 2D- and 3D-tree structure of transformed addresses according to embodiments of the invention.
Figure 8:
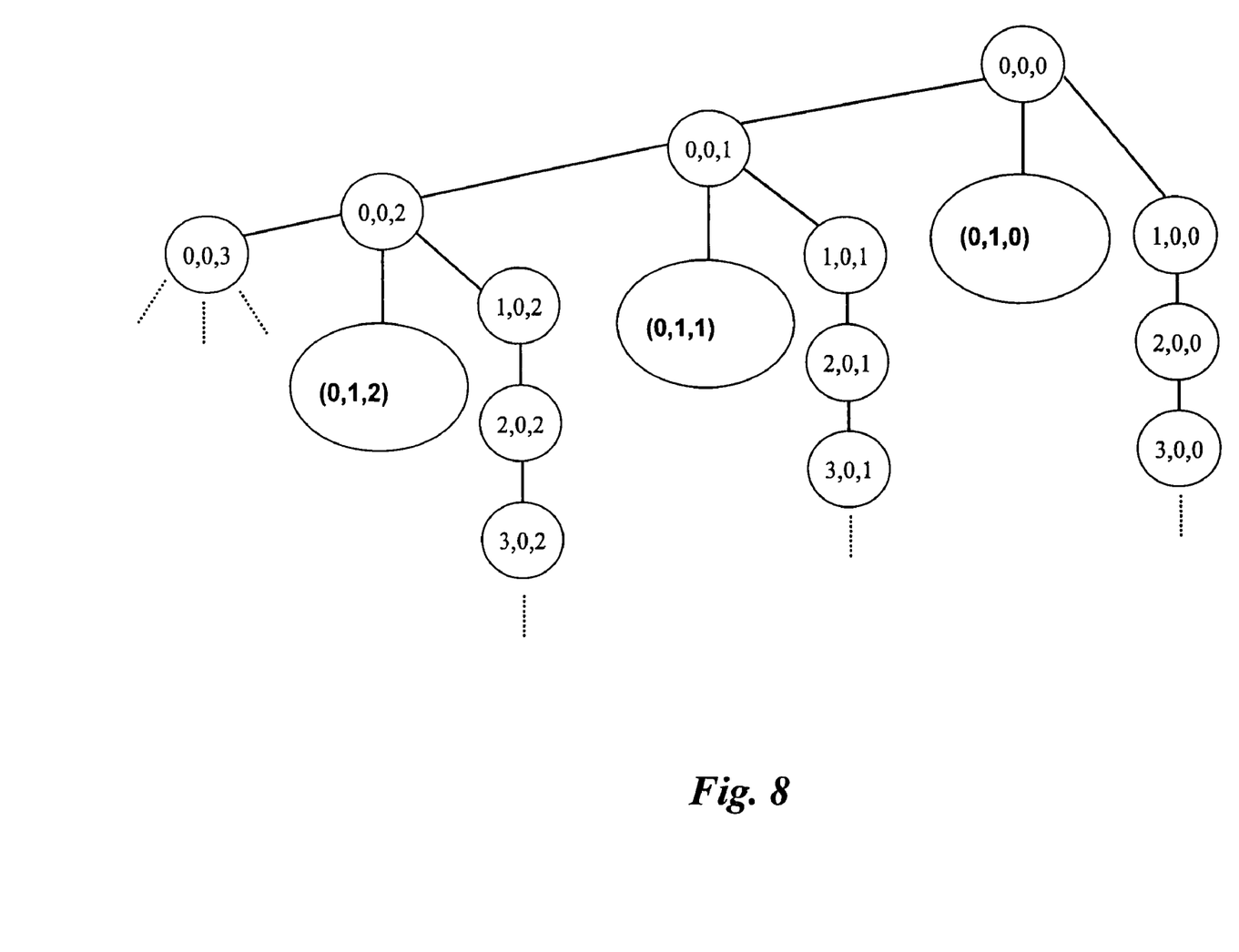

FIGS. 7 and 8 show how the potential address space can be logically transformed to a 2D- and 3D-tree structure of addresses, respectively. The transformation is efficient in the sense that all addresses in the parallelepiped are transformed to the tree structure such that suitable addresses from the tree are allocated and assigned to joining nodes in a systematic and adaptive manner. This also ensures that no address conflict occurs because each node knows the address space that is allocated to child nodes. This address space is a sub-tree that is rooted at the address of the parent node.

The following address allocation methods are described, on demand, and dynamic. The methods enable the address tree to grow in any dimension until a predetermined boundary is reached.

On Demand Address Allocation

Figure 9:
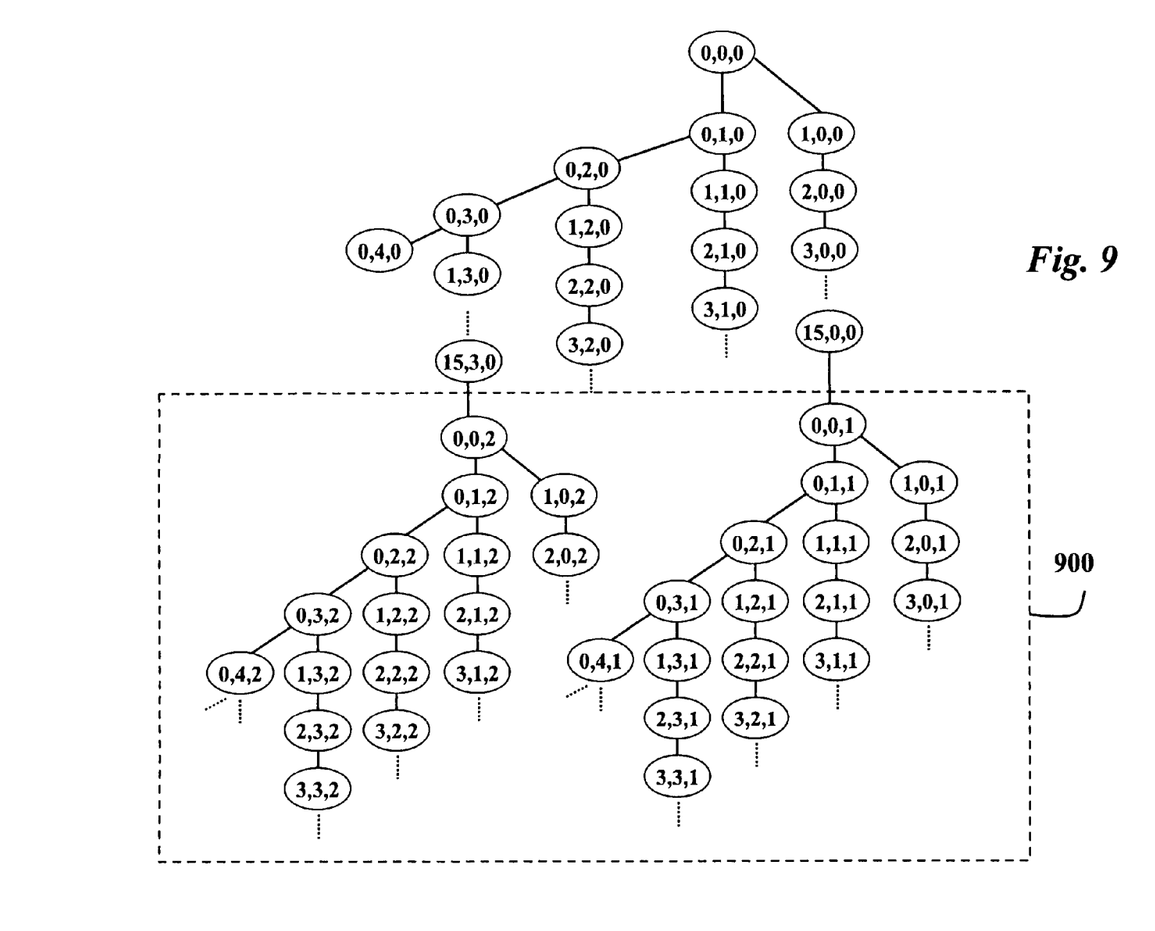
FIG. 9 is a tree structure with additional addresses according to an embodiment of the invention.

The on demand allocation method is suitable where nodes tend to form clusters in network. The head node in each cluster can be allocated a block of addresses. The allocated address space is initialized as an N-K dimensional address space, where 0<K<N. For example when K=1, addresses along N−1 dimensions are initially allocated. If a node needs additional addresses, then the node can be allocated additional addresses from the coordinator node. The additional addresses in a subtree 900 have the $N^{th}$ dimension, as shown in FIG. 9.

Dynamic Expansion of Address Space

The dynamic allocation method partitions the available address space into two or more portions. A first portion, called an allocated address space (AAS), is defined by reducing a size of the potential address space along each dimension, for example, by half. The remaining portions of the potential address space remains unallocated. This portion is the unallocated address space (UAS). The UAS portion(s) of the address space is reserved for subsequent address allocation as needed. The size of the address portions can vary.

For example, N=2 and addresses can have any of 256 values along each dimension. In other words, each address has two fields and each field is eight bits long. The address space consists of 256×256=64K addresses.

When starting the network, 64 addresses are allocated along each dimension. In other words, the network starts with an address space where the format of each address is defined to include two six bit fields. The size of the resulting AAS is 64×64=4K addresses. Subsequently, when a node needs additional addresses, the node can increment the number of bits for one of the two fields.

If the node changes the format by increasing M for the first field by 1 bit, then the size of address space along that dimension doubles, i.e., 128 addresses, and the size of address space being used becomes 128×64=8K. The node informs all other nodes in the network about the new current format of the address space with a message that is broadcast throughout the network. In this way, the addressing scheme (format) becomes adaptive to the physical topology of the network. The format of the address can also be changed by increasing the value of N, i.e., the number of fields in the address, or the number of dimension in the address space, to make the addressing scheme more flexible.

Figure 10:
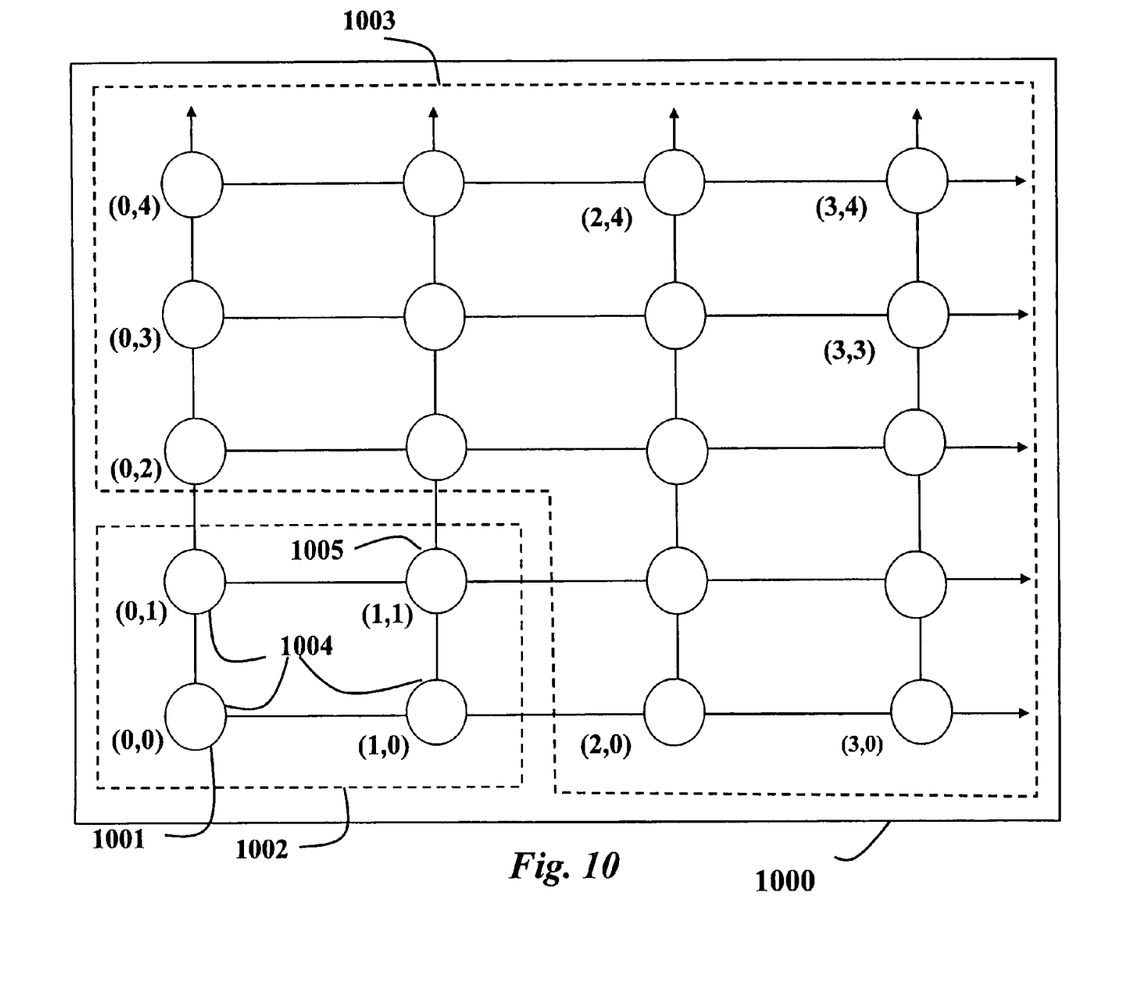
FIG. 10-12 are grids of allocated and unallocated addresses according to embodiments of the invention.

FIG. 10 shows a part of a, e.g., 8×8, two dimensional address space 1000. Node 1001 is the coordinator node. Addresses 1002 are allocated, and addresses 1003 are unallocated. Addresses 1004 are allocated and assigned, while address 1005 is allocated but unassigned. The initial address space has of 64 addresses of ordered pairs, (0, 0) through (7, 7). The allocated address space is 2×2. It may be noted that only one bit for each field suffices for defining this address space. The coordinator device, which starts the network, assumes address (0, 0).

Two child nodes subsequently join the network and obtain addresses (1, 0) and (0, 1), respectively. Another node that tries to join as a child node of parent node (1, 0) can only assign address (2, 0) to its child node. But that address, though contained in original address space, is not yet part of the AAS. Node (1, 0) can expand its AAS 1002 along a first dimension. That is done by changing the format of the address by first allocating one additional bit to the corresponding field, i.e., the new M is M+1 and then informing all other nodes of the changed format by transmitting a network wide broadcast frame.

Figure 11:
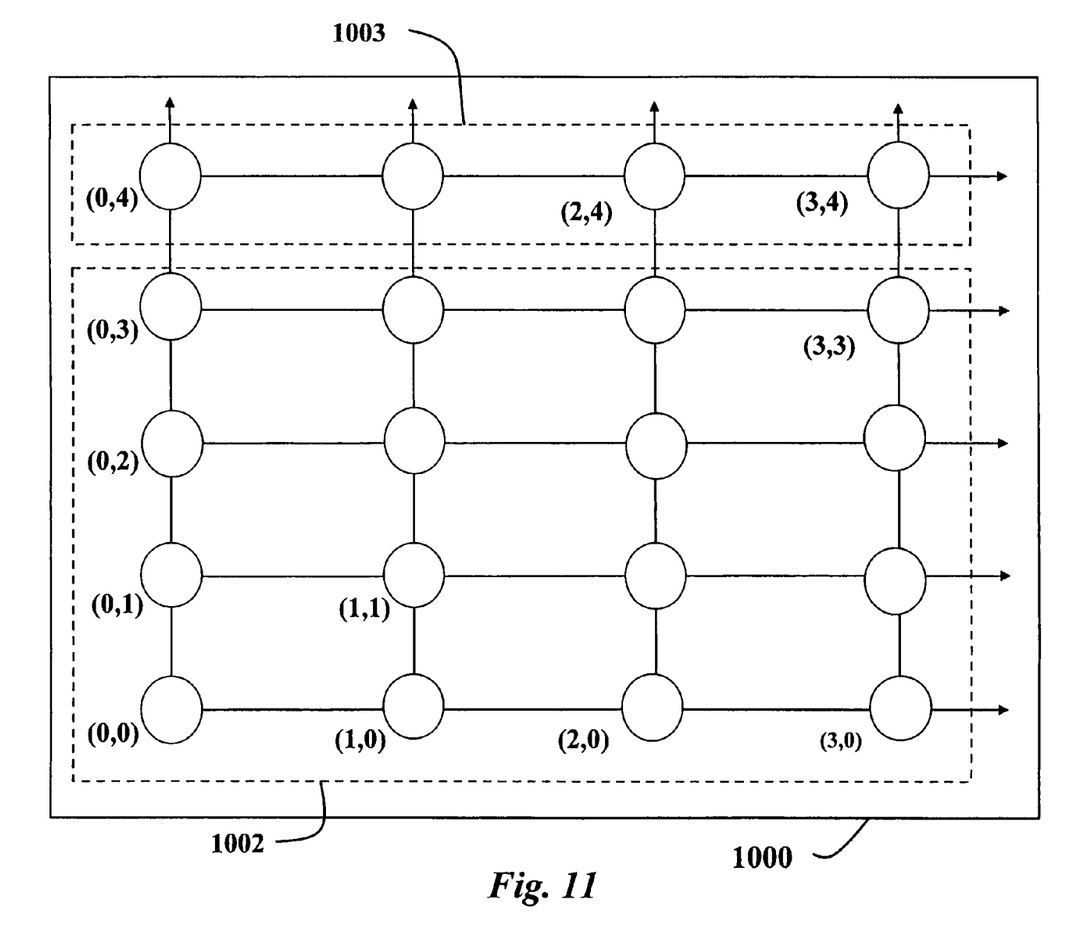
Figure 12:
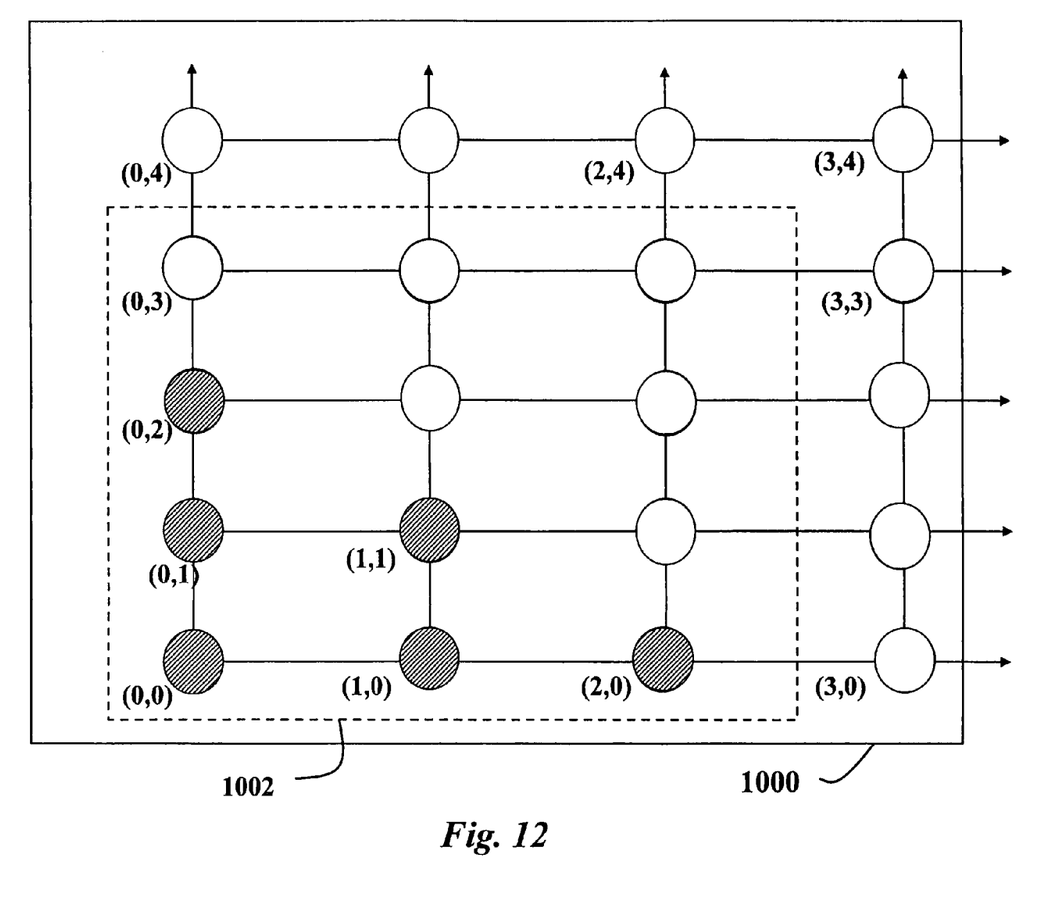

The allocation of one additional bit effectively doubles the size of the AAS as shown in FIG. 11. The address of (2, 0) now becomes available to be assigned to the joining child of node (1, 0). Subsequently, a node join network as a child of node (0, 1), and obtains a network address as (1, 1) as shown in FIG. 11.

Now assume that another node wants to join as the second child of node (1, 0). Address (0, 2), which belongs to original address space, currently is not contained in the AAS and thus can not be assigned until the AAS is expanded. So, node (1, 0) expands AAS along second dimension by changing the format by adding an extra bit to the second field and broadcasting the updated format of the addresses. It then assigns address (0, 2) to the requesting node.

In this way, the address space is gradually extended along any of two dimensions when and where needed. This increases the capability of the topology of the network to adapt to the geographic distribution of nodes. Moreover, the scheme guarantees that no address conflict takes place while nodes allocate addresses to their child nodes independently in a distributed fashion. Also, it has minimal overhead cost because nodes do not need to obtain addresses from a potentially bottlenecked central node. Also, a mechanism for conflict detection and resolution is not needed.

We can increase the number of dimensions in the parallelepiped that is used to transform the address space into a tree structure. As an example, consider a three-dimensional address space, where the allocated address space initially includes only four addresses on the plane between X-axis and Y-axis. The coordinator node starts the network by assuming address (0, 0, 0) and a node joins it as child with address (1, 0, 0).

Another node requests to join as a child of node (1, 0, 0). Therefore, the AAS is extended along the X-axis by changing the format by adding an additional bit to the first field. The new node then gets the address (2, 0, 0). Two additional nodes join as child nodes of the coordinator node. The first one node is assigned an address (0, 1, 0), while the coordinator extends the address space along the Z-axis before it assigns address (0, 0, 1) to the other node. The extension effectively doubles the size of the AAS by adding eight new addresses. These addresses are (0, 0, 1), (1, 0, 1), (2, 0, 1), (3, 0, 1), (0, 1, 1), (1, 1, 1), (2, 1, 1), and (3, 1, 1). If a new node joins the network as a child of node (0, 1, 0), The AAS extends to make the address (0, 2, 0) available to node (0, 1, 0) for assigning to its new child.

Selecting a Dimension for Extension

The dimension (field) selected for extending the format of the address space can be selected randomly. Another approach selects a lowest available dimension to be extended. The resulting tree structure in such a system is significantly deeper than being wider. A better approach, selects a highest available dimension (right most field) while extending the AAS. This results in a substantially balanced tree structure. The selected dimension can also be made dependent on a particular application or network when a particular tree shape can be more desirable than others.

Overhead Cost

Generally, an addressing scheme incurs various types of overhead costs while allocating and assigning addresses to nodes. The costs include power, communication, storage, and processing costs. If the coordinating node assigns addresses to joining nodes, then communication cost can be significant due to the fact that the coordinating node are several hops away from most of the joining nodes.

On the other hand, if the nodes maintain an address table in a distributed addressing scheme, the storage cost per node can be significant. The processing cost is due to updating internal states of the nodes and buffering data frames as a result of a change in the address format.

Our address definition, allocation and assignment scheme is distributed with minimal communication cost due to the fact that only a pair of frames is generally communicated between the child and parent nodes while address are allocated and assigned.

However, if the parent node does not have any unassigned addresses and needs to extend its address space, the parent node sends a network wide broadcast frame. That is the only significant communication cost. The cost can be reduced by carefully selecting the value of N, i.e., the number of dimensions of the parallelepiped, the size of each field, and an initial size of the AAS. The storage cost is negligible.

Selecting Partition Size

If the size of the initially allocated address space is very small, then the number of times that the address space is extended is high. That potentially introduces higher overall cost associated to the addressing scheme due to the broadcasts and state updates. On the other hand, a smaller initial size provides more flexibility and higher degree of adaptability to the network's physical topology. This offers a trade off between adaptability and cost. For optimal performance, the size of the initially allocated address space should be large enough to minimize the overhead cost, and at the same time, offer a required flexibility. That, however, may be highly dependant on the actual application. In general, we prefer to allocate initially an address space that has a size equal to about one-fourth of the size of an actual parallelepiped along each dimension.

It should be noted, that the above techniques adapt the format of the node addresses as the network grows. The same techniques can be used to adapt to shrinkage as nodes leave the network in an ad hoc manner. For example, in a real-world factory setting, changes in the environment might obsolete cluster of sensor, as machinery is replaced. Similarly, in a campus setting, entire buildings may be replaced. By adapting the format of the addresses to the actual ad hoc network topology, at any time, the size of the addresses space can be made to fit the topology in an efficient manner, by minimizing overhead.

EFFECT OF THE INVENTION

The embodiments of the invention transform an N-dimensional address space into a tree structure without losing any addresses. Two approaches for allocating and assigning addresses from the tree to joining nodes are described. In one approach, the addressing tree initially has N−1 dimensions. The addresses along the $N^{th}$ dimension are allocated only on demand. This approach is suitable for networks where nodes form clusters such that a large portion of the address space can be assigned to the head of the cluster.

Each address along the $N^{th}$ dimension represents a portion of the available address space. While table routing can be used in any case, this approach enables routing within clusters.

The second approach starts with a relatively small N-dimension parallelepiped. Each dimension is partitioned into, e.g., two parts. This block space is called the allocated address space (AAS). The addresses are assigned from the AAS. This approach allows the AAS to grow in any suitable dimension as needed. That causes the underlying addressing tree to grow in depth or width accordingly.

A parent node can always claim additional address space for itself as long as at least one free bit in the address is available.

These approaches guarantee that no address conflict occurs while allocating and assigning address in a distributed fashion due to the use of the underlying tree structure. These approaches do not suffer from the static characteristics of typical tree based schemes. For example, the depth or fan-out values of the tree do not need to be preconfigured. Moreover, nodes can have a different number of child nodes. Thus, the approaches adapt well to the geographical distribution of nodes.

In contrast to static addressing schemes with static formats, the above approaches do not suffer from an uneven saturation problem where one part of the network runs out of addresses preventing new nodes from joining, while other parts of the network have available addresses.

The above described addressing schemes provide a regular addressing structure, i.e. a tree, which can be distributed. The scheme has a low communication overhead because only one request is required for a block of addresses. The scheme does not require address conflict resolution, because conflicts cannot occur at all. Storage requirements are minimal because only a root address of the block being allocated is recorded. The scheme adapts to the geographical distribution of nodes.

The address space defined, allocated when and where needed. There are no restrictions on width or depth of the addressing tree within the allocated address space. This enables pure table routing and semi tree routing of data frames.

Only one routing entry for each extra allocated block is needed to facilitate tree routing in the above described on demand address allocation. The scheme has minimal communication overhead during address allocation and assignment. A child node communicates only a few frames with a parent to obtain its network address.

Moreover, it may be beneficial to combine multiple address allocation and assignment schemes in a single network. So, for example, addresses along the $N^{th}$ dimension, or as stated above, K dimensions, where 0<K<N, of the total potential address space can be reserved for allocation on demand, and the addresses along remaining (N-K) dimensions can be allocated dynamically as new nodes join.

Another combination of schemes can be that a single address along the $N^{th}$ dimension, which fact represents a large block of the addresses, is allocated on demand, and addresses within each such block are allocated dynamically. This later scheme is particularly suited for networks including many clusters. Address allocation in each cluster is adaptive because the address tree for each cluster grows independently from the trees for other clusters, and adaptively according to node distribution.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for defining, allocating and assigning addresses to nodes in an ad hoc wireless network, comprising a coordinator node of the network for performing steps of the method, comprising the steps of:
defining a format of each address in a set of potential addresses as having N fields with any particular field having M bits;
allocating initially a subset of the set of potential addresses as addresses to be assigned to new nodes joining the network, in which the format of each address in the subset of address has N fields; and
changing adaptively the format of the addresses in the subset of addresses by changing the number of fields in each address to change adaptively a size of the subset of addresses.

2. The method of claim 1, in which the changing is performed on demand.

3. The method of claim 1, in which the changing is performed dynamically.

4. The method of claim 1, in which the changing further comprises:
increasing adaptively the number N of fields.

5. The method of claim 1, in which the changing further comprises:
decreasing adaptively the number N of fields.

6. The method of claim 1, in which the changing further comprises:
increasing adaptively the number M of the particular field.

7. The method of claim 1, in which the changing further comprises:
decreasing adaptively the number M of the particular field.

8. The method of claim 1, in which the set of addresses is transformed to a tree structure, and the subset of addresses is represented by a subtree of the tree structure.

9. The method of claim 1, further comprising:
assigning only the addresses of the subset to the new nodes joining the network.

10. The method of claim 6 in which the particular field is selected randomly.

11. The method of claim 1, in which M is the same for each field.

12. The method of claim 1, in which M is different for different fields.

13. The method of claim 6, in which the field are in a left-to-right order, with a highest dimension in the left most field, and a lowest dimension on the right most field, and the selected field is the right most field.

14. The method of claim 1, in which the set of potential addresses form an N dimensional hypercube.

15. The method of claim 1, further comprising:
broadcasting a current format of the addresses to the nodes of the network after the changing.

16. The method of claim 1, in which the format of the addresses enables multiple paths between two nodes.

17. The method of claim 1, in which a size of the subset of addresses is about one quarter of the set of addresses.

18. The method of claim 1, further comprising:
associating a cluster of nodes with one of the fields.

19. The method of claim 1, in which the changing adapts to a topology of the network.

20. The method of claim 1, in which the subset of addresses has N-K fields, where $0<K<N$.

* * * * *